United States Patent
Sugiyama et al.

[11] Patent Number: 5,443,635
[45] Date of Patent: Aug. 22, 1995

[54] CEMENT COMPOSITIONS

[75] Inventors: Masashi Sugiyama; Kyoichi Tanaka, both of Tsukuba; Kazuo Komatsu, Ibaragi, all of Japan

[73] Assignee: Fujisawa Pharmaceutical Co., Ltd., Osaka, Japan

[21] Appl. No.: 170,253

[22] PCT Filed: Jun. 30, 1992

[86] PCT No.: PCT/JP92/00826
§ 371 Date: Jan. 3, 1994
§ 102(e) Date: Jan. 3, 1994

[87] PCT Pub. No.: WO93/01144
PCT Pub. Date: Jan. 21, 1993

[30] Foreign Application Priority Data
Jul. 1, 1991 [JP] Japan .................... 160428

[51] Int. Cl.⁶ ............................................ C04B 22/00
[52] U.S. Cl. ................................. 106/717; 106/819; 106/820
[58] Field of Search ............... 106/717, 696, 713, 721, 106/726, 737, 738, 739, 785, 817, 812, 819, 820

[56] References Cited

U.S. PATENT DOCUMENTS
4,142,909  3/1979  Gaines .

FOREIGN PATENT DOCUMENTS
2323654  4/1977  France .

OTHER PUBLICATIONS
Database WPI, Derwent Publications Ltd., Class H01, AN 92-164731, SU-A-1 654 542, Jun. 7, 1991.

*Primary Examiner*—Mark L. Bell
*Assistant Examiner*—Paul Marcantoni
*Attorney, Agent, or Firm*—Oblon, Spivak, McClelland, Maier, & Neustadt

[57] ABSTRACT

An admixture for cement compositions containing tetrahydroborate, and cement composition containing a tetrahydroborate admixture made of salt borohydride, cement, aggregate and water. Since tetrahydroborate has the expansion effect hardly influenced by temperature, expansion amount is easily controlled. Since cells generated by foaming are fine, a hardened body with the excellent resistance to freezing and thawing can be obtained.

6 Claims, 1 Drawing Sheet

CEMENT COMPOSITIONS

DESCRIPTION

1. Technical Field

This invention relates to a new admixture for cement compositions with the expansion action almost independent of temperature and for preparing cement compositions with improved durability to freezing and thawing, and relates to cement compositions using the admixture.

2. Background Art

An expansion agent is added to cement compositions such as a cement milk, mortar and concrete to provide lightening property, adiabatic property, low contraction property and the like.

Further, an expansion agent is added to, e.g., concrete for being placed in a constraint space where a construction joint cannot integrate with old concrete like a back placing concrete working method to compensate volume decrease.

Conventionally, aluminum powder is generally used as such an expansion agent in view of influence on concrete properties and circumstance, and economy. This expansion agent made of aluminum powder is chemically reacted with alkali components in a cement mixture to generate hydrogen gas. The hydrogen gas acts so as to expand surrounding cement mixture.

However, for aluminum powder, the expansion amount is significantly influenced by temperature. Even if an additive amount of aluminum powder is the same, the expansion amount increases with higher temperature and the expansion amount decreases with lower temperature. Thus, control of expansion amounts is difficult. Further, concrete using aluminum powder as an expansion agent has poor resistance to freezing and thawing. Since aluminum powder is liable to be oxidized in the air, care should be taken to handling and storage thereof.

An object of the invention is to provide an admixture for cement compositions with the expansion action almost independent of temperature, for preparing cement compositions with improved resistance to freezing and thawing, and to provide an admixture for cement compositions with stability in the air; and to provide cement compositions with the admixture.

DISCLOSURE OF THE INVENTION

The invention is an admixture for cement compositions characterized by containing tetrahydroborate, or a cement composition containing such tetrahydroborate, cement, aggregate and water.

Illustrative tetrahydroborate used for the invention are sodium borohydride ($NaBH_4$), lithium borohydride ($LiBH_4$), calcium borohydride ($Ca(BH_4)_2$) and ammonium borohydride ($NH_4BH_4$). Of them, sodium borohydride is preferably used in view of the handling property.

Sodium borohydride is a complex metal hydride in a white powder form with molecular weight of 37.86. For the thermal stability thereof, it is stable in dry air up to 300° C., it is decompounded (under vacuum) at 400° C. and it is rapidly decompounded above 550° C. to generate hydrogen and a slight amount of diborane. Although it is inflammable and hygroscopic, it can be handled in the air. It is gradually hydrated with moisture to hydrolysis.

It appears that expansion action due to such tetrahydroborate is resulted from that the tetrahydroborate generates hydrogen gas in a cement mixture and this hydrogen gas foams to provide cells inside.

This foam action is hardly influenced by temperature. Expansion amounts due to tetrahydroborate are almost determined by additive amounts thereof. Namely, if additive amounts are the same, the same expansion amount can be obtained, for example, at 20° C. and 5° C. Accordingly, since desired expansion amounts are obtained by adjustment of additive amounts, expansion amounts can be easily controlled.

Tetrahydroborate has an advantageous effect for improving the resistance property against freezing and thawing of a hardened body as well. It appears that this effect is caused by fineness of cells generated by the above foam action.

Cement compositions of the invention basically become a rigid hardened body by chemical reaction between cement and water. The main components thereof are cement, water and aggregate. To the main components are added the above tetrahydroborate and, if necessary, the other various admixtures.

The additive amount of tetrahydroborate is properly determined by a desired expansion amount and application. However, the general additive amount is 0.001 to 10 wt % for cement. Particularly, in the case where improvement of the resistance to freezing and thawing is the only objective to be obtained, the preferable amount is 0.001 to 0.05 wt % for cement. If the amount exceeds 0.05 wt %, the almost same effect can be obtained.

As an addition method, it may be added at the time of mixing and tempering a composition or may be previously added in cement. Further, it can be added after pouring a composition into a frame.

The other components to be used together with tetrahydroborate may be properly selected among generally used materials in view of applications and objects. They can be added at general amounts.

BEST MODE FOR CARRYING OUT THE INVENTION

Now, with embodiments, the invention will be described in more detail.

EXAMPLES 1 TO 4

Figure 1:
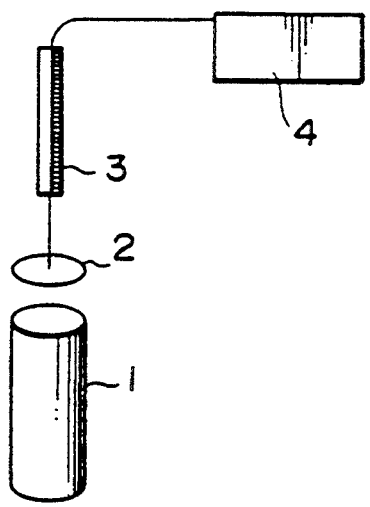
FIG. 1 is a view showing an expansion amount measuring device for examining an expansion effect due to an admixture for cement compositions according to the invention.

Normal Portland cement (specific gravity 3.16) 320 parts by weight, water 181 parts by weight, Kisarazu sand as an aggregate (specific gravity 2.61) 831 parts by weight, Kasama crushed stone (specific gravity 2.65) 852 parts by weight, and Palic SA (trademark, produced by Fujisawa Pharmacentical Co. Ltd.) 0.2 parts by weight per normal Portland cement 100 parts by weight as an AE (air entraining) water reducing agent were mixed. In this fresh mixed concrete, the water-cement ratio was 57%, the slump value was 18 to 20 cm, and the air content was 4.3 to 5.1%. Sodium borohydride 0.05, 0.1, 0.15 or 0.2 parts by weight per normal Portland cement 100 parts by weight was added thereto, and then sufficiently mixed. Subsequently, a certain amount of this mixture was poured in a cylinder-like frame 1 (inner diameter 10 mm, depth 20 mm) of a device for measuring expansion amounts as shown in FIG. 1. The surface thereof came in contact with a plastic plate 2 and was hardened. A position change of the plastic plate 2 before and after hardening was measured with a displacement gage 3 attached to the plastic plate 2. Measured results were recorded in a recorder 4 connected with the displacement gage 3. From the results, expansion ratios were calculated. Here, hardening was conducted in two cases that both the concrete temperature and air temperature were 20° C. and that the both were 5° C. The results are shown in Table 1.

to 1.3%. Sodium borohydride 0.05, 0.1, 0.2 or 0.5 parts by weight per normal portland cement 100 parts by weight was added thereto, and then sufficiently mixed. Subsequently, this mixture was poured into a frame and hardened. The hardened body obtained was subjected to 200 cycle freezing and thawing test.

For comparison, the above fresh mixed concrete was hardened without addition of sodium borohydride, and the mixed concrete was hardened in the same manner as the above examples except that conventional aluminum powder was used instead of sodium borohydride. These hardened bodies were also subjected to 200 cycle freezing and thawing test. The results are shown in Table 2.

TABLE 2

|  | Example | | | | Comparative Example | | | |
| --- | --- | --- | --- | --- | --- | --- | --- | --- |
|  | 5 | 6 | 7 | 8 | 7 | 8 | 9 | 10 |
| Sodium borohydride* | 0.05 | 0.1 | 0.2 | 0.5 | — | — | — | — |
| Aluminum powder* | — | — | — | — | — | 0.015 | 0.02 | 0.025 |
| Slump (cm) | 18.1 | 18.6 | 17.8 | 19.1 | 17.4 | 16.5 | 17.2 | 17.1 |
| Air content (%) | 0.6 | 0.6 | 1.3 | 1.3 | 0.7 | 0.6 | 0.7 | 0.6 |
| Expansion amount (%) (20° C.) | −0.02 | 0.31 | 1.14 | 3.60 | −0.74 | 1.65 | 3.11 | 4.52 |
| Freezing thawing durability test Relative dynamic modulus of elasticity (%) | 87 | 91 | 93 | 83 | breaking | breaking | breaking | breaking |

*Additive amount (parts by weight) per cement 100 parts by weight

For comparison, in Table 1, expansion ratios when the above fresh mixed concrete was hardened without addition of sodium borohydride, and expansion ratios when the mixed concrete was hardened in the same manner as the above examples except that conventional aluminum powder was used instead of sodium borohydride are shown.

Figure 2:
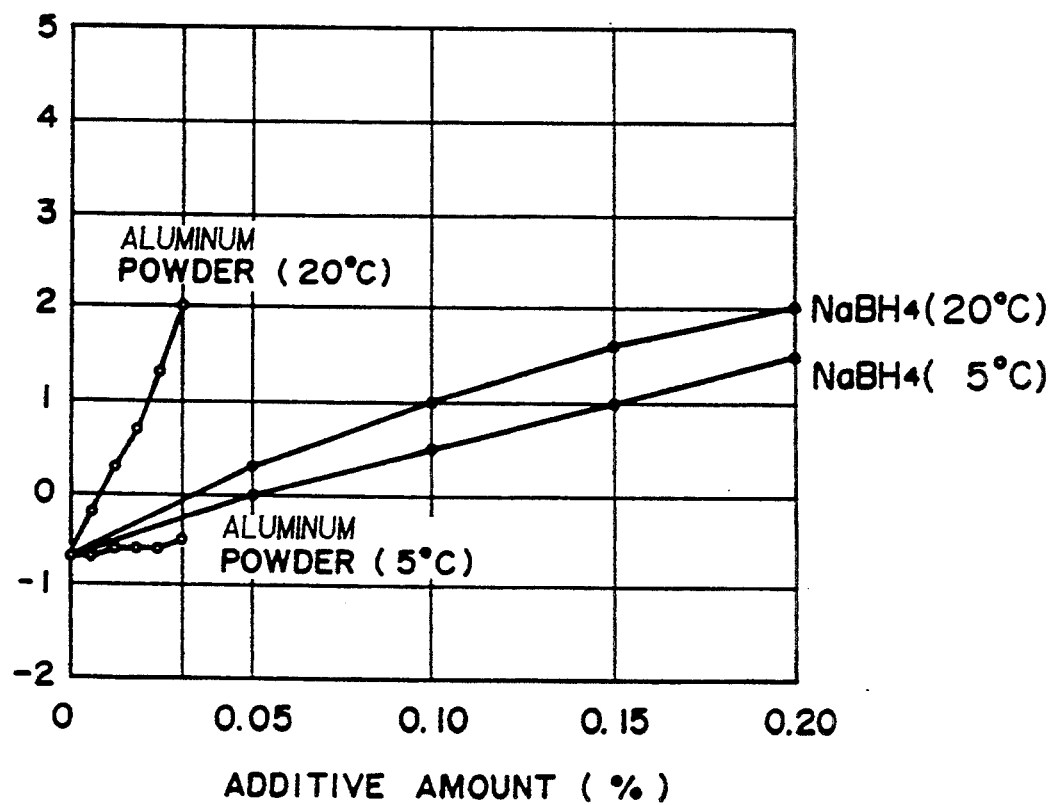
FIG. 2 is a graph showing an expansion effect due to an admixture for cement compositions according to the invention.

FIG. 2 is a graph showing the above results as change in an expansion ratio against an additive amount of an expansion agent.

Table 2 shows that the hardened bodies of Examples 5, 6, 7 and 8 had excellent freezing and thawing durability with the relative dynamic modulus of elasticity of 80% or more, while all the hardened bodies of Comparative Examples 7, 8, 9, and 10 were broken in the test. In general, when the relative dynamic modulus of elasticity was 60% or more, the freezing and thawing durability should be judged to be satisfactory.

EXAMPLES 9 TO 12

TABLE 1

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Sodium borohydride* | 0.05 | 0.1 | 0.15 | 0.2 | — | — | — | — | — | — |
| Aluminum powder* | — | — | — | — | — | 0.01 | 0.015 | 0.02 | 0.025 | 0.03 |
| Expansion Ratio (%) 20° C./ 5° C. | 0.3/ 0.0 | 1.0/ 0.5 | 1.6/ 1.0 | 2.0/ 1.5 | −0.7/ −0.7 | −0.2/ −0.7 | 0.3/ −0.6 | 0.7/ −0.6 | 1.3/ −0.6 | 2.0/ −0.5 |

*Additive amount (parts by weight) per cement 100 parts by weight

Table 1 and FIG. 2 show that if the other conditions were the same, the expansion effect of sodium borohydride hardly changes with change in a handling temperature condition. The effect changes only by an additive amount. On the contrary, the expansion effect of aluminum powder remarkably depends on temperature condition. In order to obtain a desired expansion ratio, temperature condition must be taken into consideration. Therefore, control of an additive amount is very difficult.

EXAMPLES 5 TO 8

Normal Portland cement (specific gravity 3.16) 347 parts by weight, water 208 parts by weight, Kisarazu sand as an aggregate (specific gravity 2.60) 856 parts by weight and Kasama crushed stone (specific gravity 2.65) 908 parts by weight were mixed. In this fresh mixed concrete, the water-cement ratio was 60%, the slump value was 17 to 20 cm, and the air content was 0.6

Normal Portland cement (specific gravity 3.16) 550 parts by weight, water 165 parts by weight, Kisarazu sand as an aggregate (specific gravity 2.60) 703 parts by weight and Oume crushed stone (specific gravity 2.63) 978 parts by weight were mixed. In this fresh mixed concrete, the water-cement ratio was 30%, the slump value was 20.5 to 22.0 cm, and the air content was 1.0 to 1.4%. Sodium borohydride 0.005, 0.01, 0.03 or 0.05 parts by weight per normal portland cement 100 parts by weight was added thereto, and then sufficiently mixed. Subsequently, this mixture was poured in a frame and hardened. The hardened bodies obtained was subjected to 300 cycle freezing and thawing test.

For comparison, the above fresh mixed concrete was hardened without addition of sodium borohydride, and the mixed concrete was hardened in the same manner as the above examples except that conventional aluminum powder was used instead of sodium borohydride. These hardened bodies were also subjected to 300 cycle freezing and test. The results are shown in Table 3.

TABLE 3

|  | Example | | | | Comparative Example |
| --- | --- | --- | --- | --- | --- |
|  | 9 | 10 | 11 | 12 | 11 |
| Sodium borohydride* | 0.005 | 0.01 | 0.03 | 0.05 | — |
| Slump (cm) | 20.0 | 21.3 | 21.0 | 20.5 | 22.0 |
| Air content (%) | 1.1 | 1.3 | 1.2 | 1.4 | 1.0 |
| Expansion amount (%) (20° C.) | 0.02 | 0.43 | 1.27 | 1.89 | −0.31 |
| Freezing thawing durability test Relative dynamic modulus of elasticity (%) | 98 | 100 | 100 | 100 | breaking |

*Additive amount (parts by weight) per cement 100 parts by weight

Table 3 shows that each of the hardened bodies of Examples had excellent freezing and thawing durability with the relative dynamic modulus of elasticity of substantially 100%, while all the hardened bodies of Comparative Examples were broken in the test.

INDUSTRIAL APPLICABILITY

As described above, the admixture for cement compositions of the invention are useful as an expansion agent to be mixed with various cement compositions such as general structural concrete for civil engineering building works and secondary products. Further, the admixture is also useful as an agent for improving the freezing and thawing durability.

We claim:

1. A cement composition comprising cement, aggregate, water and tetrahydroborate, said tetrahydroborate being present in an amount of from 0.001 to 0.03 parts by weight per 100 parts by weight of cement.

2. A cement composition according to claim 1, wherein said tetrahydroborate is sodium borohydride.

3. A cement composition according to claim 1, wherein said tetrahydroborate is present in an amount of from 0.005 to 0.03 parts by weight per 100 parts by weight of cement.

4. The cement composition of claim 1, wherein said tetrahydroborate is present in an amount of from 0.005 to 0.01 parts by weight per 100 parts by weight of cement.

5. The cement composition of claim 1, wherein said tetrahydroborate is present in an amount of 0.03 parts by weight per 100 parts by weight of cement.

6. The cement composition of claim 1, wherein said tetrahydroborate is present in an amount of 0.001 parts by weight per 100 parts by weight of cement.

* * * * *

UNITED STATES PATENT AND TRADEMARK OFFICE
CERTIFICATE OF CORRECTION

PATENT NO. : 5,443,635
DATED : August 22, 1995
INVENTOR(S) : Masashi SUGIYAMA, et al.

It is certified that error appears in the above-indentified patent and that said Letters Patent is hereby corrected as shown below:

On the title page, Item [54] and Column 1, Line 2, the title should read:

--CEMENT COMPOSITION--

Signed and Sealed this

Fourteenth Day of November, 1995

*Attest:*

BRUCE LEHMAN

*Attesting Officer*     *Commissioner of Patents and Trademarks*